United States Patent Office 3,642,643
Patented Feb. 15, 1972

3,642,643
REGENERATION OF COPPER OXIDE AND COPPER CHROMITE CATALYSTS
Clarence E. Habermann, Midland, Mich., assignor to The Dow Chemical Company, Midland, Mich.
No Drawing. Filed Dec. 15, 1969, Ser. No. 885,324
Int. Cl. B01j 11/30, 11/66
U.S. Cl. 252—412                                       8 Claims

ABSTRACT OF THE DISCLOSURE

The activity of a copper oxide or copper chromite catalyst deactivated while being used to convert a nitrile to the corresponding amide may be regenerated by oxidizing the catalyst, and then contacting the oxidized cuprous catalyst with a reducing agent at an elevated temperature.

BACKGROUND OF THE INVENTION

In prior applications cited below, reduced copper oxide and copper chromites have been demonstrated to be useful heterogeneous catalysts for converting nitriles to corresponding amides. After a number of hours of use in such a reaction, the catalytic activity of the catalyst is substantially diminished. Most efficient use of such catalyst would require reactivation.

A limited number of other heterogeneous catalysts are known for the conversion of nitriles to amides, for example, Heafele in U.S. Pat. 3,366,639 and Watanable in Bull. Chem. Soc. Japan, 37, 1325 (1964). Neither of these references suggests a method for regenerating the catalyst after use, and as a practical manner, none of the catalysts shown in the art would be commercially feasible without regeneration and longer life.

In a broader perspective, a number of methods for activating a spent catalyst are known. Such regeneration techniques are generally applicable only to a specific catalyst used in a specific process. As a result, regeneration techniques applicable to one catalyst useful in a particular reaction may not work for all catalysts useful in the reaction. Also, a particular method of reactivation of a specific catalyst may work when the catalyst is used in the presence of a particular substrate, but when the catalyst is employed after regeneration on another substrate or in another reaction, the reactivation technique may have no effect.

CROSS-REFERENCES TO RELATED APPLICATION

The present application is a result of the continuing work with heterogeneous catalysts for converting nitriles to their corresponding amides described in previous applications by Clarence E. Habermann and Ben A. Tefertiller, Ser. No. 791,807, filed Jan. 16, 1969 and Ser. No. 835,765, filed June 23, 1969. The present application is also related to a similar application filed by Clarence E. Habermann, Ser. No. 882,715 filed Dec. 5, 1969, entitled "Regeneration of Copper Oxide and Copper Chromite Catalysts."

SUMMARY OF THE INVENTION

According to the present invention, a two-step method for regeneration of copper oxide or copper chromites which have been deactivated while being used to convert a nitrile to the corresponding amide has been discovered. In the first step, the spent catalyst is oxidized and then in the second step the oxidized catalyst is reduced with a suitable reducing agent at an elevated temperature.

In the preferred process of the invention, the spent copper oxide or copper chromite catalyst is contacted with an oxidizing agent, such as aqueous hydrogen peroxide at normal room temperature for a few hours, and then the oxidized catalyst is contacted with hydrogen at a temperature of about 130° C. to about 250° C. for a few hours. By such preferred treatment, a substantial amount of the original activity of the catalyst may be restored without substantial degradation.

The copper chromite catalysts of the present invention are those catalysts generally referred to as Adkins catalyst, either reduced or unreduced. These copper chromite catalysts may be prepared by a number of different procedures, for example, by the decomposition of copper ammonium chromate, by the decomposition of copper ammonium chromium carbonates, by the decomposition of copper-chromium nitrates or by grinding or heating together copper oxides and chromium oxides. These catalysts are also sometimes referred to as copper-chromium oxide.

Prior to activation, the catalysts are deactivated by use in the conversion of essentially any nitrile having up to about 20 carbon atoms to the corresponding amide by contacting an aqueous solution of a nitrile with a catalyst under suitable reaction conditions. During the course of such hydration reaction, the activity of the catalyst decreases. After a number of hours of use, the activity of the catalyst is relatively low and regeneration of the catalyst is desirable. Heretofore, no suitable technique has been known for the regeneration of such copper oxide or copper chromite catalysts to restore their activity in the conversion of a nitrile to an amide. By the use of the present invention, however, high activity and long catalyst life are restored.

The oxidation of the copper oxide or copper chromite catalyst may suitably be accomplished by contact with a peroxide, by contact with an oxygen containing gas as described in my copending application or by some other suitable method of oxidation. Essentially any oxidizing agent that may be washed or otherwise removed from the catalyst after oxidation may be employed. Of special interest are oxidizing agents which yield reaction products that may be removed as a gas or by an aqueous wash.

The preferred peroxide treatment as shown in the present invention may suitably be conducted in the liquid phase with essentially any peroxide. Representative peroxides suitable for use in the present invention include: hydrogen peroxide; inorganic peroxides such as, metal peroxides, peroxy acids and peroxy salts; and organic peroxides, such as hydroperoxides, dialkyl peroxides, peroxy acids and peroxy esters. Examples of these peroxides include: alkali and alkaline earth metal peroxides such as sodium peroxide, lithium peroxide, calcium peroxide and barium peroxide; inorganic peroxy acids, such as peroxymono and peroxydisulfuric acid and peroxymonophosphoric acid; inorganic peroxy salts, such as ammonium peroxydisulfate, sodium peroxyborates and sodium carbonate peroxyhydrates; organic hydroperoxides, such as methyl hydroperoxide, t-butyl hydroperoxide, 2-heptyl hydroperoxide and cumene hydroperoxide; organic dialkyl peroxides, such as methyl ethyl peroxide, cumyl methyl peroxide, methyl ethyl ketone peroxide, and t-butyl 2-cyanoethyl peroxide; organic peroxy acids, such as peroxyacetic acid, peroxyformic acid and peroxybenzoic acid; and peroxyesters, such as t-butyl peroxyacetate and t-butyl benzeneperoxysulfonate. Of the organic peroxides, those having a melting point less than about 100° C. are preferred, with those having a melting point of less than 25° C. being especially preferred. Of special interest in the invention is the use of hydrogen peroxide and sodium peroxide in the regeneration.

The conditions of the peroxide treatment of the used cuprous catalyst may vary widely. The preferred treatment of the catalyst to give the best activation depends on the nature of the peroxide, the concentration of the peroxide solution, the temperature of the peroxide treatment and the length of the peroxide treatment. As more concentrated peroxide solutions and higher temperatures are employed in a peroxide treatment, shorter times are required to obtain the desired results.

The peroxide used to treat the spent catalyst is usually an aqueous solution although other solvents, such as ethers may be employed. The concentration of the solution may vary widely as different peroxides and solvents are employed in the treatment. For aqueous hydrogen peroxide, concentrations of about 1 to about 30 percent are preferred.

The temperature of the peroxide treatment of the catalyst is related to the nature and concentration of the peroxide. Generally, temperatures of about 20° to about 200° C. are preferred. The peroxide treatment is usually conducted at as low a temperature as will be permitted by the nature of the peroxide in accord with reasonable time limitations.

The peroxide treatment of spent copper oxide or copper chromite catalyst sometimes causes an exothermic reaction. Regeneration in the liquid phase with a peroxide in the present invention provides a suitable and convenient method of controlling such a possible exothermic reaction. Even though the liquid phase in the oxidation absorbs large amounts of heat, it may be expedient to initially contact the spent catalyst with relatively dilute solutions of peroxide to avoid an uncontrolled vaporization.

The reduction of the second step in the reactivation of the catalyst is controlled by the interrelationship of the nature and amount of the reducing agent, the temperature of reduction, and the duration of the reduction. The reduction of the oxidized copper oxide or copper chromite may be monitored by the loss of weight during reduction if the reducing agents and reduction products are removed. The weight loss for each individual catalyst may vary widely, but catalysts of the invention usually lose about 2 to about 20% of their weight during a hydrogen reduction. The weight loss during reduction which gives optimum activity for a particular catalyst may be easily determined by experience.

Although the reduction of the oxidized catalyst with hydrogen is preferred, other reducing agents may also be employed. For example, the reduced catalyst may be prepared by contacting the oxidized copper oxide or copper chromite at an elevated temperature with ammonia, hydrazine, carbon, carbon monoxide, a lower alkane or a lower alkanol or other reducing agents.

The temperature of the reduction may vary widely so long as the desired degree of reduction is obtained. Generally, temperatures of about 50° to about 500° C. are employed with temperatures of about 100° to about 300° C. being preferred. When hydrogen is employed as the reducing agent, temperatures of about 130° to about 250° C. are especially preferred.

The reduction of the catalyst may be conducted with essentially any amount of reducing agent and for essentially any period of time that gives a significant degree of reduction. At lower temperatures, large amounts of reducing agent and long periods of time are generally required, but within the preferred range of temperatures using hydrogen as a reducing agent, times of only a few hours are required to obtain a desirable degree of reduction.

Thus by using the process of the present invention, copper oxide and copper chromite catalysts that have been deactivated while being employed to convert nitriles to amides may be conveniently and inexpensively reactivated by contacting the spent catalyst with an oxidizing agent and then reducing the oxidized cuprous catalyst with a suitable reducing agent, such as hydrogen, at an elevated temperature.

Regenerated catalysts may be employed to convert essentially any nitrile to the corresponding nitrile by contacting an aqueous solution of the amide with the cuprous catalyst under suitable reaction conditions. The hydration of nitriles having up to about 20 carbon atoms is preferred and may be conducted in the gaseous phase or preferably in the liquid phase at temperatures of about 0° to 400° C., with 25° to 200° C. being of special interest. In the liquid phase reaction, pressure has no substantial effect, and in the gaseous reaction, pressure is not critical.

SPECIFIC EMBODIMENTS

Examples 1–4

A copper chromite catalyst containing 80% copper oxide, 17% chromium oxide and 3% inert ingredients sold under the trade name Harshaw Cu 0203 was reduced with hydrogen and employed in the conversion of acrylonitrile to acrylamide until its activity had diminished. The used catalyst was then regenerated by contacting 10 g. of the catalyst with 70 g. of various peroxide solutions for 5 hours, washing and drying the catalyst, and then reducing the catalyst with hydrogen at 150° C. for 4 hours. All conditions of each regeneration were the same except for the changes in the nature of the peroxide, the concentration of the peroxide and the temperature as noted in Table I. The activities of the catalysts of Table I were tested in bomb hydration runs reacting 5 grams of a 7% by weight aqueous acrylonitrile solution in the presence of one gram of the catalyst for one hour at 80° C. The results of the regenerations compared to used catalyst and used catalyst with only reduction are shown in Table I. Each reduced catalyst gave no $\beta$-hydroxypropionitrile, but the used copper chromite gave a 32.1% yield of this by-product.

TABLE I.—REGENERATION OF COPPER CHROMITE CATALYSTS

| Catalyst treatment | T., °C. | Conversion of acrylonitrile | Yield of acrylamide |
|---|---|---|---|
| Example: | | | |
| 1 ........ 2.5% aqueous $H_2O_2$ .......... | 25 | 18.8 | 70.7 |
| 2 ........ 5% aqueous $H_2O_2$ .......... | 50 | 21.6 | 80.9 |
| 3 ........ 10% aqueous $H_2O_2$ .......... | 25 | 22.2 | 69.5 |
| 4 ........ 18% methyl ethyl ketone peroxide in ethanol. | 25 | 18.0 | 71.3 |
| Comp. A... Used catalyst; before reduction. | ........ | 9.0 | 54.8 |
| Comp. B... Used catalyst; hydrogen reduction. | ........ | 16.4 | 60.3 |

In the same manner as shown in the examples above, other peroxides, such as sodium peroxide, peroxymonophosphoric acid, sodium peroxyborates, cumene hydroperoxide, propyl peroxide and peroxyacetic acid may be contacted with the used reduced or unreduced copper oxide or copper chromite catalyst at temperatures of 20° to 200° C. to oxidize the used catalyst.

Also, in a manner similar to the examples above, the used copper oxide or copper chromite catalyst may be oxidized with an oxygen containing gas, such as air, 10% oxygen–90% argon or 5% oxygen–95% nitrogen. The used catalysts may also be oxidized with other oxidizing agents such as aqueous solutions of potassium permanganate or sodium dichromate.

The oxidized catalysts as prepared above may then be reduced by contact with a hydrogen containing gas, carbon monoxide or hydrazine at temperatures of 50° to 500° C. to give a catalyst with activity in the conversion of a nitrile to an amide substantially higher than the used catalyst.

Such regenerated catalysts may be used to convert acrylonitrile to acrylamide, benzonitrile to benzamide, adiponitrile to adipamide and other nitriles containing up to about 20 carbon atoms to the corresponding amide by contacting an aqueous mixtures of the amide with the regenerated catalyst at 0° to 400° C., or preferably at a temperature of 25° to 200° C.

I claim:

1. A method of regenerating a copper oxide or copper chromite catalyst which has been deactivated while being used to convert a nitrile to the corresponding amide, by contacting an aqueous solution of said nitrile with said catalyst, consisting essentially of oxidizing the used catalyst with peroxide in the liquid phase and then reducing the oxidized catalyst at an elevated temperature to remove about 2 to about 20% of the weight of said oxidized catalyst.

2. The method of claim 1 wherein the peroxide is hydrogen peroxide, an inorganic peroxide or an organic peroxide having a melting point below 100° C.

3. The method of claim 2 wherein the peroxide is hydrogen peroxide or sodium peroxide.

4. The method of claim 1 wherein the peroxide is a 1 to 30% by weight aqueous solution of hydrogen peroxide.

5. The method of claim 1 wherein the peroxide is contacted with the catalyst at a temperature of 20° to 200° C.

6. The method of claim 1 wherein the oxidized catalyst is reduced with hydrogen.

7. The method of claim 1 wherein the oxidized catalyst is reduced at a temperature of 50° to 500° C.

8. The method of claim 1 wherein a copper chromite catalyst is regenerated.

References Cited

UNITED STATES PATENTS

| | | | |
|---|---|---|---|
| 2,964,579 | 12/1960 | Kirsch et al. | 252—467 |
| 2,397,705 | 4/1946 | Teter | 252—416 |
| 3,406,011 | 10/1968 | Zirngibl et al. | 252—411 |
| 3,381,034 | 4/1968 | Greene et al. | 260—561 N |
| 3,062,883 | 11/1962 | Gilbert et al. | 260—561 R |

DANIEL E. WYMAN, Primary Examiner

P. E. KONOPKA, Assistant Examiner

U.S. Cl. X.R.

252—414, 416; 260—558 R, 561 R, 561 N